United States Patent
Khakdaman et al.

(10) Patent No.: US 7,491,750 B2
(45) Date of Patent: Feb. 17, 2009

(54) CONTINUOUS CATALYST / WAX SEPARATION METHOD

(75) Inventors: Hamid Reza Khakdaman, Tehran (IR);
Bahman Amini Horri, Karaj (IR);
Hossein Manafi Varkiani, Tehran (IR);
Sasan Sadraei Noori, Tehran (IR);
Khairolah Jafari Jozani, Karaj (IR)

(73) Assignee: Research Institute of Petroleum Industry (RIPI), Tehran (IR)

( * ) Notice: Subject to any disclaimer, the term of this patent is extended or adjusted under 35 U.S.C. 154(b) by 0 days.

(21) Appl. No.: 11/506,061

(22) Filed: Aug. 16, 2006

(65) Prior Publication Data

US 2007/0039852 A1    Feb. 22, 2007

(30) Foreign Application Priority Data

Aug. 16, 2005    (EP)    ................. 05107539

(51) Int. Cl.
C07C 27/00    (2006.01)
B01J 20/34    (2006.01)

(52) U.S. Cl. ............................. 518/700; 502/22; 502/29

(58) Field of Classification Search ................. 518/700; 502/22, 29
See application file for complete search history.

(56) References Cited

U.S. PATENT DOCUMENTS

| | | | |
|---|---|---|---|
| 4,162,965 A | 7/1979 | Clapper | |
| 4,217,830 A | 8/1980 | Himmelheber, Sr. | |
| 4,559,133 A | 12/1985 | Siegfried et al. | |
| 4,605,678 A | 8/1986 | Brennan et al. | |
| 4,670,472 A | 6/1987 | Dyer et al. | |
| 5,827,903 A | 10/1998 | White et al. | |
| 5,900,159 A | 5/1999 | Engel et al. | |
| 6,114,399 A | 9/2000 | Roberts et al. | |
| 6,217,830 B1 * | 4/2001 | Roberts et al. | 422/140 |
| 2006/0111232 A1 * | 5/2006 | Spena et al. | 502/29 |

FOREIGN PATENT DOCUMENTS

WO    WO 98/27181    6/1998

\* cited by examiner

Primary Examiner—Jafar Parsa
(74) Attorney, Agent, or Firm—Kenyon & Kenyon LLP

(57) ABSTRACT

An improved Method for the separation of catalyst particles and the wax product from the output slurry of a Fischer-Tropsch bubble column reactor comprising the contact of a hydrocarbon solvent from a cyclic solvent stream with the slurry, wherein the solvent is a hydrocarbon fraction which is pressurized and heated to its supercritical state and the temperature and the pressure of the solvent at the supercritical state are similar to those of the F-T reactor. After the separating of the catalyst from the hydrocarbon mixture of the solvent and the slurry in a catalyst separation section the hydrocarbon solvent and the wax product are separated, whereby the recovered solvent phase is lead to the cyclic solvent stream; which is used after re-pressurizing and re-heating in a supercritical solvent supply module to recycling the hydrocarbon solvent for the contact step. A system for carrying out the method is also disclosed.

13 Claims, 4 Drawing Sheets

Schematic Diagram of the catalyst/wax separation unit

Figure 1: Schematic Diagram of the catalyst/wax separation unit

Figure 2: The schematic flow diagram of the solvent recovery section

CONTINUOUS CATALYST / WAX SEPARATION METHOD

CROSS-REFERENCE TO RELATED APPLICATION

The present application claims priority to European Application No. 05107539.2104 filed in the European Patent Office on Aug. 16, 2005 of which is expressly incorporated herein in its entirety by reference thereto.

FIELD OF THE INVENTION

The present invention relates to an improved process for the separation of catalyst particles and the wax product from the output slurry of a Fischer-Tropsch Slurry Bubble Column (SBC) reactor.

BACKGROUND OF THE INVENTION

Conversion of natural gas to more valuable clean fuels, such as gasoline and diesel, has been in the center of attention for the previous fifty years by making use of the Fischer-Tropsch (F-T) process. Since in recent years new huge natural gas reserves have been discovered and explored worldwide (about 175,000 billion standard cubic meter at the end of 2003), there is a strong interest for developing means for exploitation and commercialization of this valuable resource of energy.

One of the most attractive processes for monetization of natural gas is the so called GTL (Gas to Liquid) process, including the production of synthesis gas, F-T synthesis and finally upgrading to produce clean fuels and valuable solvents.

Several reactor configurations have been developed to produce liquid products by Fischer-Tropsch synthesis such as Fixed-Bed (ARGE), Circulating Fluidized-Bed (Synthol) or Entrained-Bed, Fixed Fluidized-bed (advanced synthol) and Slurry Bubble Column (SBC) Reactors.

Gas—Solid reactors such as Fixed bed and Fluidized bed reactors encounter several problems, such as disability to remove the large amounts of released reaction heat, low conversion efficiency, non-isothermal reaction, local overheating of catalyst and low lifetime period of catalyst.

An overview on the history and some characterization of these reactors is presented in U.S. Pat. Nos. 4,670,472 and 6,217,830. Due to problems appearing with Gas-Solid reactors, other kind of the reactors, namely slurry- or three-phase reactors, were developed.

SBC reactors can handle large amounts of reaction heat in such a manner that the reaction temperature can be controlled easily, the reaction is carried out isothermally and a local overheating of the catalyst (hot spots) and then the catalyst deactivation are prevented.

In spite of the before-mentioned advantages of the SBC reactors, their application depends on the probability of utilization of a reliable technique for separation of the catalyst from the wax product. In other words, an SBC reactor can be used in a commercial scale provided that a cost-effective technique for the catalyst/wax separation is available.

During the last 50 years a lot of efforts have been made to propose methods for catalyst/wax separation. Several techniques, such as internal and external filtration, natural or forced sedimentation, magnetic separation, vacuum distillation, and chemical conversion have been used. Internal and external separation, using different filter elements, such as woven mesh, sintered metal etc has been described in various publications. Natural and forced sedimentation have, for example, been presented in WO 98/27181. Application of magnetic filtration is described in U.S. Pat. No. 4,605,678.

Internal or external filtration is one of the oldest techniques in the field of catalyst/wax separation. Filtration, in the form of pressure filtration, either performed inside the reactor or outside it, cannot keep the liquid level of the reactor at a desired value, due to high viscosity of the slurry (4-8 cp at 200° C.). In addition, internal filtration always has the plugging risk, which may lead to premature shutdowns of the reactor. Furthermore, the low separation rate which is caused by the high viscosity of the wax, and also being obliged to use catalysts of a relatively large particles size range (about 30-80 microns) to improve the filtration efficiency, results in the low efficiency of the reactor and its low conversion.

Natural or forced sedimentation techniques such as settlers and centrifuges can not be regarded as reliable techniques in catalyst/wax separation due to their inability in efficient sedimentation of the catalyst in a short time and also inability to gain favorable particle concentrations (1-2 ppm). In addition, these techniques are often performed in batch or intermittent mode, and only can be used as a preliminary separation step in catalyst/wax separation due to high viscosity of the wax and the low rate of the sedimentation. In this field, other techniques, such as addition of agglomeration agents and surface tension reduction agents to improve settling time, have not found wide application because of the mentioned problems of the settling techniques and difficulty of separation of the added reagents.

Results of U.S. Pat. Nos. 4,605,678 and 5,827,903 disclosing magnetic separation technique for catalyst/wax separation show that the technique results about 100-900 ppm catalyst loss. So, the magnetic separation is not reliable for catalyst/wax separation. Other techniques in this field such as High Gradient Magnetic Separation technique (HGMS) are relatively efficient, but they are very expensive. Because of high costs for the super conductor and also the high annual costs for electricity for HGMS filters, this method does not have a chance to be used in commercial scales.

Some other separation techniques, such as chemical conversion, have just been used in the case of Fe catalysts, but have lead to unacceptable results. Vacuum distillation can not be regarded as a reliable separation technique because of the remaining of more than 80% of the wax as a heavy residue in the vacuum distillation tower, and also because of the tendency of wax hydrocarbons for thermal cracking during distillation.

Due to the advantages of the SBC reactors, in recent years Fischer-Tropsch synthesis in the slurry phase has been focused by the research and technology centers. Almost all of them use internal or external filtration or combined internal and external filtration. But they use catalysts with a large particle size (30-80 microns) that leads to lower reactor efficiency and large catalyst make-up (50-200 ppm/feed), not desired as to economic aspects. In addition, due to high wax viscosity, they use filters with high pore size to prevent the plugging problem of filter and premature shutdowns, and hence unnecessary loss of the catalyst cannot be avoided.

Supercritical Fluid Extraction (SFE) is one of the most modern techniques presented in the field of separation. This technique has a wide range of applications in liquid-liquid and liquid-solid extractions during the last years of the twentieth century. In recent years, this technique has been used for the separation of components of medicines, herbal essences and odorants in the chemical, pharmaceutical and food industries.

U.S. Pat. No. 4,162,965 describes the principles of application of a solvent for solid particles separation from hydrocarbon mixtures. The document discloses steps of separation of solid particles from oily hydrocarbons through their contact with hydrocarbon solvents.

U.S. Pat. No. 4,559,133 describes the application of supercritical fluids in the separation of solid particles from oily hydrocarbons. Mixing steps of the supercritical solvent with oily hydrocarbons and the consecutive separation of solid particles and recovering of the solvent are described in this document.

U.S. Pat. Nos. 6,114,399 and 6,217,830 describe the application of supercritical fluid extraction in catalyst/wax separation in the product of slurry reactors.

However, the methods according to the state of the art are not very efficient and fail to provide an effective and continuous catalyst/wax separation.

SUMMARY OF THE INVENTION

Therefore, the object of the present invention is to provide a method and a system for a more effective catalyst/wax separation from the output slurry of a Fischer-Tropsch bubble column reactor which is more practicable and marketable for making a hydrocarbon product in a commercial scale.

The object is solved by an improved Method for the separation of catalyst particles and the wax product from the output slurry of a Fischer-Tropsch bubble column reactor, said method comprises:

Contacting a hydrocarbon solvent from a cyclic solvent stream with the slurry, wherein the solvent is a hydrocarbon fraction which is pressurized and heated to its supercritical state and the temperature and the pressure of the solvent at the supercritical state are similar to those of the F-T reactor;

Separating the catalyst from the hydrocarbon mixture of the solvent and the slurry in a catalyst separation section which comprises a forced sedimentation step as a primary separation stage and a following filtration step as a secondary separation stage, to form a concentrated catalyst stream containing the catalyst particles and to form an enriched solvent stream containing the reactor wax product and hydrocarbon solvent;

Separating the hydrocarbon solvent and the wax product from the enriched solvent stream in a solvent recovery section to form a recovered solvent phase and a purified wax phase;

Directing the recovered solvent phase to the cyclic solvent stream; which is used after re-pressurizing and re-heating in a supercritical solvent supply module to recycling the hydrocarbon solvent for the contact step;

Processing of the purified wax phase in an up-grading unit to produce GTL products; and providing of a make-up solvent for the cyclic solvent stream from a fresh solvent supply section additionally to the recovered solvent to compensate solvent loss in the process.

Further, the invention discloses a system for making a hydrocarbon product by a Fischer-Tropsch reaction, comprising:

A Fischer-Tropsch slurry bubble column reactor for reacting a synthesis gas in the presence of Fischer-Tropsch catalyst particles to produce a slurry comprising liquid hydrocarbon products and Fischer-Tropsch catalyst particles in said reactor;

A slurry output line connected to said slurry bubble column reactor for providing an output of said slurry;

A supercritical solvent supply module;

An apparatus connected to said slurry output line and said supercritical solvent supply module for contacting a supercritical hydrocarbon solvent with said output slurry at a temperature and pressure wherein said liquid product is soluble in said solvent to form a mixture containing the slurry and the hydrocarbon solvent;

A catalyst separation section connected to said apparatus for separating the catalyst from the mixture of the hydrocarbon solvent and the slurry to form a concentrated catalyst stream containing the catalyst particles and to form a enriched solvent stream containing the reactor wax product and the hydrocarbon solvent;

A solvent recovery section connected to said catalyst separation section and to the supercritical solvent supply module for separating the hydrocarbon solvent from the enriched solvent stream to form a recovered solvent phase for a cyclic solvent stream and a purified wax phase containing the liquid hydrocarbons;

An up-grading unit connected to the solvent recovery section for further processing of the wax; and A fresh solvent supply section connected to the supercritical solvent supply module for providing of a make-up solvent additionally to the recovered solvent to compensate solvent loss in the process.

Furthermore, the object is solved by a catalyst separation section for separating catalyst particles from a mixture containing a slurry which comprises catalyst particles and a liquid hydrocarbon product from a Fischer-Tropsch reaction and a supercritical solvent, the system comprises a device for a forced sedimentation step as a primary separation stage and a device for a following filtration step as a secondary separation stage to form a concentrated catalyst stream containing the catalyst particles and to form an enriched solvent stream containing the reactor wax product and hydrocarbon solvent.

Still further, the object is solved by a solvent recovery section for separating a hydrocarbon solvent from a mixture containing a liquid hydrocarbon product from a Fischer-Tropsch reaction and the hydrocarbon solvent, comprising devices for two flashing steps in series, two separators and two fractionators.

A first aspect of the present invention is a method and a system of separating Fischer-Tropsch catalyst particles from the output slurry of a Fischer-Tropsch bubble column reactor, the slurry comprises Fischer-Tropsch catalyst particles and the wax product containing the desired liquid hydrocarbon. The invention comprises contacting a compressed hydrocarbon solvent with the output slurry at a temperature and pressure where the liquid hydrocarbon product is soluble in the solvent. This contacting step forms a concentrated mixture containing the catalyst particles, the liquid hydrocarbon product (wax) and the hydrocarbon solvent. The contacting step is then followed by the step of separating the concentrated slurry from the enriched solvent and a solvent recovery step.

The present invention provides a process and a system for catalyst/wax separation by supercritical fluids in F-T synthesis. The properties of supercritical fluids provide unique advantages for extractions and separations. Supercritical fluids have high solubility similar to organic solvents, but with higher diffusivities, lower viscosity and lower surface tension. They can also be fractionalized and separated easily by changing the pressure and the temperature.

The present invention provides a very special apparatus to contact the supercritical solvent and the reactor outlet slurry. Further, the present invention provides a separation system to separate catalyst from the wax continuously and completely. Still further, the present invention provides a process and a system to recover the solvent from the wax through solvent recovery section. In this process preferably the light compounds were striped from the solvent and wax. It should be noted if those compounds arn't stripped, the solvent loss will increase gradually and the recovered solvent phase will be enriched by the light compounds. This condition leads to stop the operation of solvent recovery section.

As mentioned before, the treatment of the slurry with a supercritical hydrocarbon solvent described in U.S. Pat. No. 6,114,399 or other prior art in this field, comprises three common stages: the contacting step, the catalyst separation section, and the solvent recovery section. One difference, however, according to the present invention is that the system according to the present invention makes use of a special-designed apparatus for contacting the output slurry and the hydrocarbon solvent (contactor), see particular embodiment shown in FIG. 3.

The system according to the present invention for catalyst/wax separation can efficiently separate the catalyst from the wax in a continuous process, and reduce the catalyst content of the final purified wax to lower than 5 ppm. Further, the rate of separation can be similar to the production rate to prevent product accumulation in the reactor. In addition, the method according to the invention is able to continuously separate the catalyst from the wax, and to recycle the catalyst back to the reactor without any deactivation with very low catalyst loss.

The invention relates to an improvement of applying supercritical solvents for the separation of catalyst from wax in (SBC) reactors. On the other hand, the present invention relates to the commercialization of a GTL process and efficient separation of catalyst/wax for F-T slurry reactors. Furthermore, this invention presents a process and the equipments for catalyst/wax separation in F-T slurry bubble column (SBC) reactors.

The system according to the invention can efficiently separate the catalyst from the wax during a continuous process. The removed catalyst can be returned to the reactor continuously through purge with an inert gas like for example nitrogen or argon, without catalyst damage.

Due to the supercritical fluid as the solvent, the wax viscosity is dramatically decreased, for example to a viscosity at near-critical state is in the range of 0.025-0.1 cp. Reduction of the wax viscosity causes the separation process being carried out quickly. The applied solvent can be a pressurized hydrocarbon or a mixture of hydrocarbons in the state of sub- or super-critical.

The foregoing and other objects and aspects of the present invention are explained in detail in the Figures herein and the specification set forth here below.

The term "hydrocarbon" as used herein generally refers to the product of a Fischer-Tropsch reaction, though the hydrocarbon solvent may be from other sources. The Fischer-Tropsch reaction products are mixtures of predominantly alkanes and alkenes (olefins) which vary widely in molecular weight, and to a lesser extent contain alcohols and other oxygenated molecules, depending on the catalyst and reaction conditions. The ratio of alkanes and alkenes will also depend upon the catalyst employed and the reaction conditions.

The solvent is preferably a hydrocarbon fraction preferably with a normal boiling range between 66 to 69° C. The fraction can be a hydrocarbon mixture with a hydrocarbon solvent such as pentane, heptane, octane, and/or a comparable solvent. Most preferable, the hydrocarbon solvent contains at least 80% n-hexane, which can return to the catalyst/wax separation system as a recycled stream. This stream can be used as a fraction of the supercritical solvent after pressurizing and heating steps. A combined system of forced-sedimentation and filtration is applied to remove the catalyst from the wax.

The catalyst/wax separation system comprises at least a contactor for the contacting step and a catalyst separation section. Further, a solvent recovery section can applied to the catalyst/wax separation system.

The contactor is an apparatus which comprises at least two contacting sections, more preferably three contacting sections. Each contacting section can play the role of a settler. Based on the reactor capacity, the dimensions of contactor are determined in the way that provides a laminar flow in each contacting section.

The contactor comprises a slurry inlet for introducing the output slurry in the first contacting section and a solvent inlet for introducing the supercritical solvent into the apparatus; wherein a disperser connected to said inlet disperse the supercritical solvent in each of the contacting section.

Preferably, the disperser is a sparger. Such a disperser can be located in each contacting step to disperse the supercritical solvent in the slurry.

Further, the contactor comprises at least a mixing mean, preferably a number of static mixers which are located preferably in the outlet of each section to complete the mixing of the supercritical solvent and the slurry.

The contactor comprises further a gas outlet for removing light gasses, which are preferably accumulated on the top of each contacting section. The light gases are joined together and then carried of the contactor by the outlet to a light gas stream.

Still further, the apparatus comprises a rotary valve and a catalyst phase outlet for removing accumulated catalysts from the contacting sections, whereby the valve is located preferably on the bottom of each contacting section and after joining together, the catalysts are carried out by a catalyst phase outlet to a catalyst stream.

The contacting sections are connected to each other by a passage, which allows the output slurry to move from one section into another section, preferably in the direction of a slurry outlet for removing the mixture of slurry and supercritical solvent that have missed a portion of the catalyst and light gases from the apparatus to a catalyst separation section.

Preferably, the output slurry of the reactor is introduced in the first contacting section through the slurry inlet and the supercritical solvent is introduced into the apparatus through the solvent inlet; wherein a disperser connected to said inlet disperse the supercritical solvent in each of the contacting section, mixing of the slurry and the solvent and removing the mixture of slurry and supercritical solvent from the apparatus;

The system according to the present invention comprises further a catalyst separation section for separating the catalyst particles from the removed mixture.

The catalyst separation section comprises a device for a forced sedimentation step as a primary separation stage and a device for a following filtration step as a secondary separation stage to form a concentrated catalyst stream containing the catalyst particles and to form a enriched solvent stream containing the reactor wax product and hydrocarbon solvent.

Preferably, the catalyst separation section comprises at least a liquid cyclone as the primary separation stage and a filter system as the secondary separation stage.

Preferably, the filter system comprises a filter element bundle of sintered filter elements. In a preferred embodiment of the present invention, the filter elements have a low pore size, preferably of 3 to 5 microns.

The filtration tank has preferably a cylindrical-conic shape with a filter element bundle. The output stream of the liquid cyclone containing usually 5-20 percent by weight of the catalyst) is preferably introduced to filter house as the feed. The purified wax with the catalyst content of lower than 5 ppm, comes out through stream. To back flush the filter elements, a little portion of cyclic solvent is intermittently fed from top section of filtration tank as the washing solvent. The concentrated catalyst phase that has been accumulated in the bottom of filtration tank is withdrawn accompanying washing solvent.

For a 15000-bbl/day GTL plant, the plant preferably uses five filtration tanks, four on-lines and one stand-by that intermittently are replaced with together (one of them is always under back flushing). Each filtration tank has preferably a bundle of 80 filter elements. Each filter element has preferably a diameter of about 0.25 m and the height of about 2 m. The diameter of each filtration tank is about 3.5 m and the height of its cylindrical section is about 3 m and that for conic section is about 1 m. The filtration flux in the following filtration stage is about 150 lit/hr.m$^2$ and each filter element have a pore size of about 3-5 microns.

Preferably, the catalyst separation section is a combined system of a liquid cyclone as the primary separation stage and a T-type filter with several sintered metal filter elements, as the secondary separation stage The catalyst separation section can comprises in addition to the primary separation stage and the secondary separation stage a further catalyst/wax separation system.

Furthermore, with a sedimentation step as a primary separation step which is followed by a secondary filtration step, a catalyst/wax separation with higher efficiency can be achieved. Therefore, it is possible to obtain the desired concentration of the particles in the outlet wax (<5 ppm) by using the filter elements with lower pore sizes. The catalyst/wax separation using supercritical fluid and recycling of catalyst back to the reactor can be performed continuously. Both stages of the catalyst separation section operate continuously.

The liquid cyclone is able to separate at least 80-95% of the catalysts with the particle sizes of 10-15 microns, and the filter with the several tube bundles of for example sintered metal filter elements with the pore size of 3-5 microns to achieve the catalyst lost lower than 5 ppm (weight).

The quickness of catalyst/wax separation with the method according to the present invention allows an increase of the production rate of the reactor. Therefore, it's possible to use higher syngas rates in the SBC reactors. Also, due to the higher separation efficiency, it's possible to apply the catalysts with lower particle sizes (e.g. 5-15 microns). The increase in the feeding rate as well as the application of smaller catalyst particles, will cause the yield and conversion of the SBC reactor be increased. Higher conversion and yield cause to an increase in the efficiency of the SBC reactors in F-T synthesis, and this makes the GTL process more economical.

The system according to the present invention comprises still further a solvent recovery section which has preferably at least two flashing steps in series, at least two separators, and at least two fractionators.

In the solvent recovery section the light compounds are allowed to separate from the recovered solvent of the primary flash tank and also, trace of wax is separated from the recovered solvent of the secondary flash tank. It should be noted, if the light compounds (such as CO, $CO_2$, $H_2O$, $C_1$-$C_4$, and the others that accompany with wax) aren't separated, they will be accumulated in the recovered solvent and cause an increase in make-up demand and solvent loss. Furthermore, if the trace of wax isn't separated from the recovered solvent, the wax recovery would be decreased. With the solvent recovery section according to the present invention an efficient solvent recovery of about 99% is possible. Further, the light compounds are and the trace of wax is eliminated from the recovered solvent.

BRIEF DESCRIPTION OF THE DRAWINGS

The present invention may be understood with reference to FIG. 1, FIG. 2, FIG. 3 and FIG. 4

DETAILED DESCRIPTION OF THE INVENTION

Figure 1:
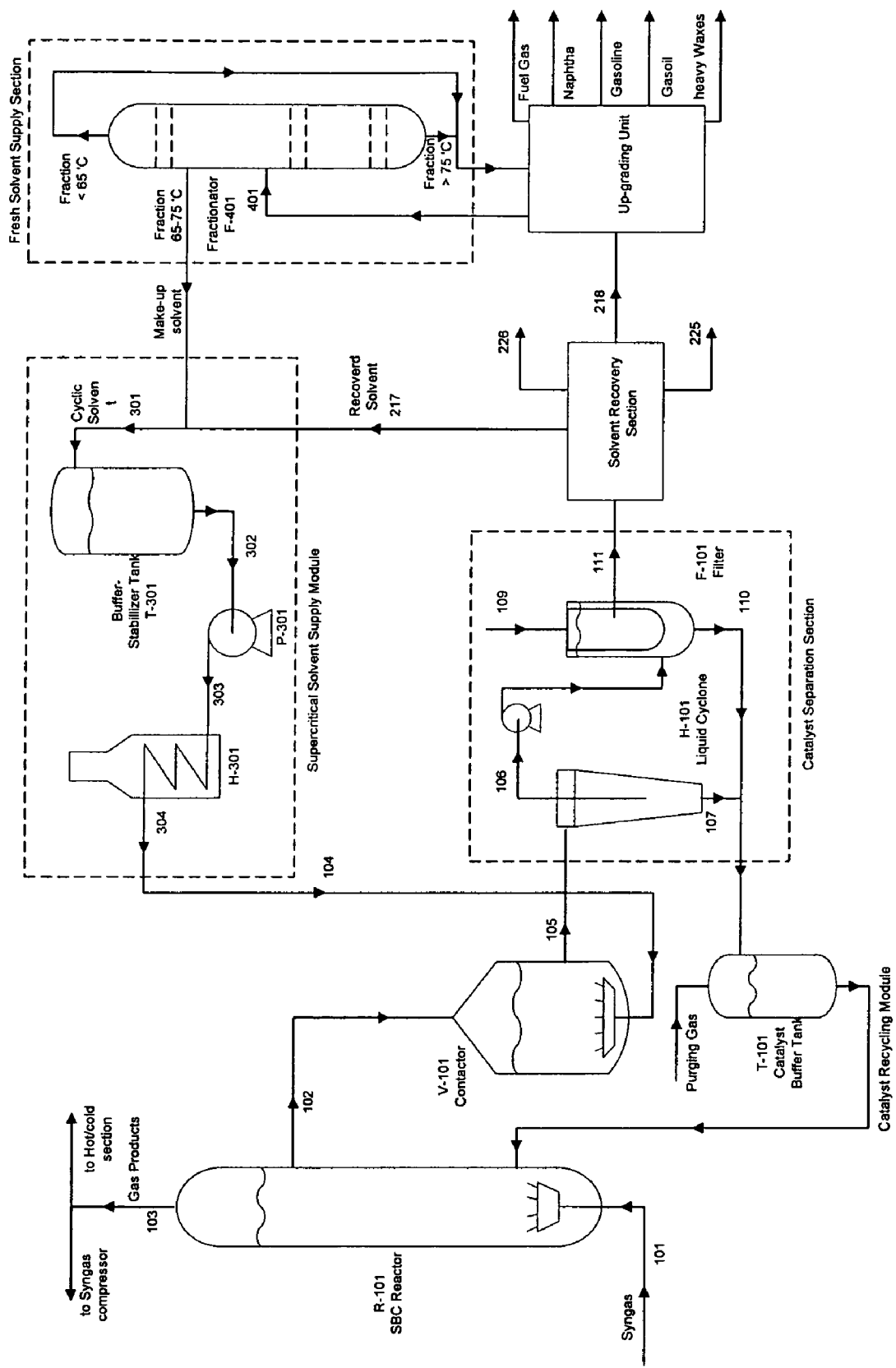
FIG. 1 is a schematic process diagram of a preferred embodiment of the invention.

FIG. 1 is a schematic process diagram of a preferred embodiment of the invention. This process is designed in a way that the contact of the output slurry of the reactor with the recycled solvents is possible. Recycled solvents comprise the solvent returning from fresh solvent supply section in the up-grading unit as a make-up stream and the recovered solvent from separation unit. The separation unit comprises a catalyst separation section and a solvent recovery section. The catalyst separation section is a combined system of separation comprising a liquid cyclone (continuous hydroclone) and a filtration system that are used to separate the catalyst from the wax. This separation leads to formation two streams namely concentrated catalyst stream and enriched solvent stream. The concentrated catalyst stream is returned to the reactor after accumulation in a buffer tank, through purging by an inert gas, and the enriched solvent after being cleared from the catalyst, is introduced to solvent recovery section, for separation of the solvent from the wax. In this section, enriched solvent is subjected to treatment and recovery stages such as depressurization, flushing, cooling, heating and distillation, to formation of two streams; recovered solvent stream and the purified wax stream. The recovered solvent stream then is combined with make-up solvent stream that is recycled from the fresh solvent supply section, and it is utilized again in the separation unit as the solvent, after re-pressurizing and heating. The purified wax is sent to the up-grading unit.

As it is shown in FIG. 1, the syngas enters the SBC reactor through line 101, at a temperature of about 200-300° C. In order to heating the reactor during start up, or to maintain isothermally the reactor temperature during operation, a saturated vapor coil, which is not shown in the diagram, is used inside the reactor. The operational pressure of the reactor is about 18-42 bar, preferably about 30-40 bar for the separation process of this invention. The catalyst used in the process of the present invention can be one of the acidic aluminosilicates like ZSM-5 on the basis of metals like iron, cobalt, nickel or ruthenium. Depending on the aim of the gas conversion process, like the conversion of synthesis gas to motor fuels, petroleum hydrocarbons or aromatic hydrocarbons, the type of the catalyst and its preparation method can be different. The catalysts size used in the SBC reactors can be in the range of 0.1-100 micron and preferably in the range of 1-20 microns. Most preferably the range for the catalyst size is 3-10 microns. Recommended catalyst size for this invention is in the range of 10-15 microns. The concentration of the catalyst particles in the wax can vary from 10,000 to 400,000 ppm (wt.). Preferable range of catalyst content is 150,000-200,000 ppm (wt.). F-T synthesis can produce hydrocarbons in the range of $C_1$-$C_{200}$. If Co-catalysts are used, $C_8$-$C_{55}$ hydrocarbons will be produced. In the case of the present invention the wax hydrocarbon products are in the range of $C_{10}$ to $C_{36}$.

The wax hydrocarbons, together with the suspend catalysts particles, form a mixture, which is called the slurry. The slurry, as will be mentioned later, should subject to a catalyst/wax separation process. The gaseous hydrocarbons produced by the F-T reaction, together with the inert gases and un-reacted hydrocarbons, exit from the top of the reactor through line 103. The main portion of this gaseous stream is subjected to cooling and separation stages, to produce liquefied heavy and light hydrocarbons as well as water and light gases that are produced in FT reaction.

As it is shown in FIG. 1, the catalyst and wax mixture (the slurry) leaves the reactor through line 102. A degasser vessel is used to separate the gases which accompanying with the outlet slurry of the reactor. The gaseous stream of degasser vessel joins to effluent gas of the reactor. The de-gassed slurry is sent to the contactor. The degasser vessel is not shown in FIG. 1, so the output slurry is sent to the contact vessel (V-101) through line 102. V-101 is a contactor, which can be a mixer or a stirrer tank with a baffle and impeller. It can also be a magnetically coupled vessel or a simple tank without any stirrers. Due to high molecular diffusivity of the supercritical solvent, it can solve the slurry in a very short residence time (about minutes). For simple tank contactors it is better to introduce solvent and slurry from the bottom and top section of the tank respectively.

The solvent fraction used in the process of the invention can be chosen from a carbon number range of $C_4$ to $C_{12}$. The best fraction is a mixture of hydrocarbons with the normal boiling range of 65-75° C., and more particularly between 66-69° C. This fraction contains preferably at least 80% n-hexane and its isomers. In the reactor temperature and pressure, this hydrocarbon fraction will be in the supercritical state. The operation conditions of the reactor are preferably a pressure of 30-40 bar and a temperature of 250-300° C. Under these conditions, the mentioned solvent fraction will have a viscosity of 0.02-0.2 Cp. The viscosity of the output slurry of the reactor is about 1-20 cp, which should be decreased to 2-6 cp, under the operational conditions.

The solvent fraction is mixed with the output slurry of the reactor in the contactor V-101, in a solvent/wax ratio of 1/1 to 10/1. Preferably, the solvent/wax ratio is 4/1 to 6/1. The viscosity of the solvent-slurry mixture reaches to 0.5-1 cp for the condition of the present method. The solvent-slurry mixture leaves the contactor through line 105 and goes to H-101 which is a liquid cyclone (hydroclone). It is designed in a way that it can separate 80-95% of the catalyst particles from the solvent-slurry mixture. H-101 is the primary separation stage of the catalyst. The catalyst particles, accumulated at the bottom of the liquid cyclone and go to catalyst buffer tank T-101 through line 107. The second output stream of H-101, which has lost most of its catalyst content, leaves through line 106, by means of P-101 pump, and is sent to the filtration section F-101, which is the secondary catalyst separation stage. The stream of line 107 and 110 join together and form concentrated catalyst stream, which predominantly contains the catalyst.

In order to provide a catalyst-free wax (with a catalyst concentration range of from 1-5 ppm), the second output stream of H-101 is sent to an industrial T-type or S-type filter (F-101). This section separates the remaining catalyst particles, which could not be separated in the liquid cyclone. The filter element of the F-101 is sintered metal type or woven mesh with pore sizes lower than 5 micron. The porosity of the filter is preferable to be about 3-5 micron. In order to increase the filter efficiency, it is possible to back flush it through line 109 using a light hydrocarbon fraction. The concentrated catalyst stream that is gathered in the buffer tank T-101, is recycled back to the reactor by purging with an inert gas (such as Argon). The catalyst can also be sent from this vessel to the regeneration unit, if needed. The required equipments and flow module for the purging and also for entering the fresh catalyst to the reactor is not shown in FIG. 1.

Figure 2:
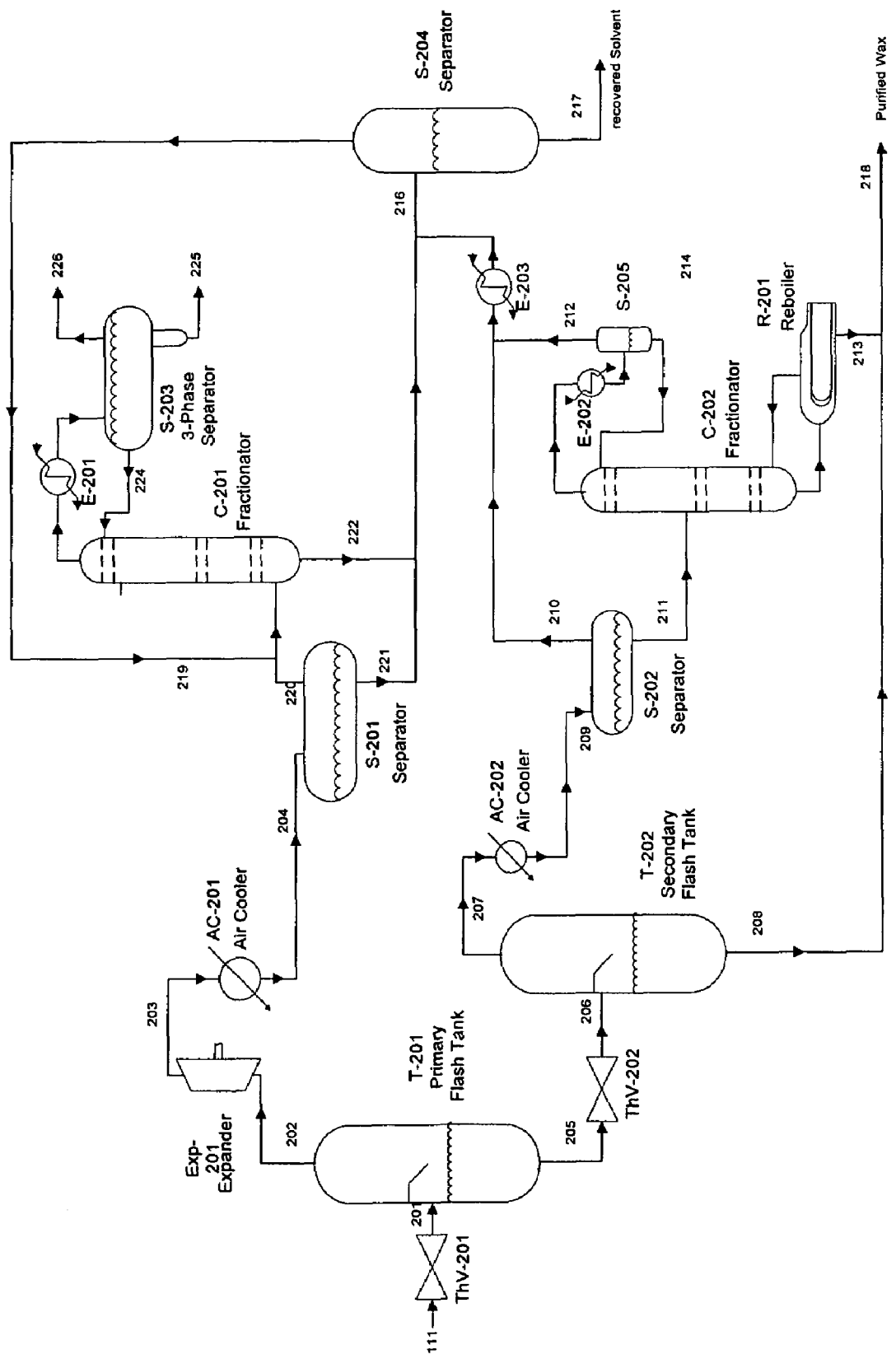
FIG. 2 is a schematic process diagram of a preferred embodiment of the solvent recovery section according to the present invention.

The enriched solvent stream comprising of the solvent and the catalyst-free wax, with a catalyst concentration of 1-5 ppm, leaves the filter (F-101), through line 111 and is sent to the solvent recovery section. The solvent recovery section is shown in the FIG. 2. This section comprises of two flashing steps and two fractionation steps. Each flashing step includes depressurization and separation stages. The purpose of this section is to separate the solvent from the wax. The separation solvent section is processed in a way that it possible to recover at least 99% of total solvent. It's not allowed the wax content of the solvent be increased in the separation loop. The solvent-loss in this section is kept lower than 1% (wt.) of total solvent. The main problems of this separation are entering of light components (such as $CO_2$, CO, water and $C_1$ to $C_4$ and other) in recovered solvent of the primary flashing step and trace of wax in the recovered solvent of the secondary flashing step. To solve this problem two fractionation columns are used. One fractionation column for the separation of the light component from the recovered solvent in the primary flashing step and the other one for the separation of the trace wax from the recovered solvent in the secondary flashing step.

The stream 111 that has a pressure of about 30-40 bar is first introduced to throttle valve ThV-201. The outlet stream 201 has a pressure in the range of 10-20 bar. The purpose of this pressure reducing is to create a two-phase stream. The outlet pressure is adjusted in a way that at least 95-99% of the light components be introduced in the gas phase. Stream 201 is sent to the primary flash tank T-201. Gaseous stream of T-201 (stream 202) is passed through an expander (Exp-201) to pressure reduction and energy recovery. Then it is introduced to air cooler (AC-201) stream 204 sent to the separator S-201 to create a gaseous stream (stream 220) that contain almost all of the light component and a liquid stream containing a portion of solvent (stream 221). Stream 220 is sent to the column C-201 to separate the light component from the solvent. The bottom of C-201 (stream 222) has no light components. The three-phase separator S-203 is used to separate water (stream 225), light components (stream 226), and a liquefied solvent stream (stream 224) that is recycled back to the column C-201.

The liquid stream of T-201 (stream 205) is passed from ThV-202 (to reduce its pressure like the expander Exp-201) and introduced to the secondary flash tank T-202. The gaseous effluent of T-202 (stream 207) is sent to an air cooler (AC-202) and a separator (S-202). The aim of application of AC-202 is liquefaction of the portion of the wax that is introduced in gas phase after depressurizing in ThV-202. These waxy hydrocarbons with a portion of solvent in the liquid phase are withdrawn from the bottom of S-202 (Stream 211) and then, it's sent to fractionation column C-202. The bottom stream of C-202 is a small portion of primary introduced wax. The main portion of primary introduced wax is separate in T-202 and withdrawn through line 208. The streams 208 and 213 will form the purified wax (stream 218). The gaseous effluents of S-202 and C-202 are joined together and after condensation in the condenser E-203, are joined with the bottom streams of S-201 and C-201 to form a solvent stream (stream 216). To separate the light components from the recovered solvent, this stream is sent to separator S-204. The gaseous effluent of S-204 is recycled back to the fractionation column C-201 (stream 219). The liquid stream of S-204 is the recovered solvent stream (stream 217). This stream is joined with the make-up solvent stream to form a stream that called cyclic solvent. The cyclic solvent recycled back to the contactor vessel after re-pressurizing and heating to spend again as the supercritical solvent.

The present process that suggested for solvent recovery section can recover at least 99% of the total solvent and stripping of light compounds in the recovered solvent. The purified wax, which accompanies with about 1% solvent loss, is sent to the upgrading unit through line 218, for more processing to produce GTL products such as naphtha, diesel, gasoline, special solvents and etc.

The purified wax, with lower than 5 ppm catalyst content and the carbon number range of $C_{12}$ to $C_{36}$, will be subject to operations such as hydrocracking, hydrotreating and several fractionation, in the up-grading unit. In the up-grading unit some of the wax hydrocarbons will change to lighter products. Another fraction of the hydrocarbons will consist of the heavier products, and will result in special heavy waxes.

The fresh solvent supply section is schematically shown in FIG. 1. Accordingly, to produce this fraction, a portion of the outlet stream of the naphtha hydrotreater reactor (or the product naphtha stream) of the up-grading unit is sent to the fractionation column (F-401) through line 401. Those hydrocarbons having boiling points below 65° C. and also those compounds having boiling points higher than 75° C. returns to the proper stream in the up-grading unit. About 1% of the spent solvent used in this process is provided from the fresh solvent supply section. This make-up solvent stream, which returns through line 402, joins with the recovered solvent stream through line 217 from the solvent recovery section (FIG. 2), and is sent to the supercritical solvent supply module. The resulting stream of 217 and 402, through line 301, is sent to a buffer-stabilizer tank T-301, in the supercritical solvent supply module. The normal boiling range of hydrocarbons content of this reservoir is about 66-69° C. and also has at least 96-99% of n-hexane, and is used as the cyclic solvent for separation unit.

The solvent is sent to a high duty HPLC pump (P-301) through line 302. Then the solvent passes through a heater (H-301) to achieve the desired temperature. The outlet stream of H-301 has a pressure in the range of 35-40 bar and a temperature in the range of 250-300° C. This condition means the supercritical state for the solvent. This stream is sent to the contactor vessel V-101 through line 304 to re-use as the supercritical solvent.

Figure 3:
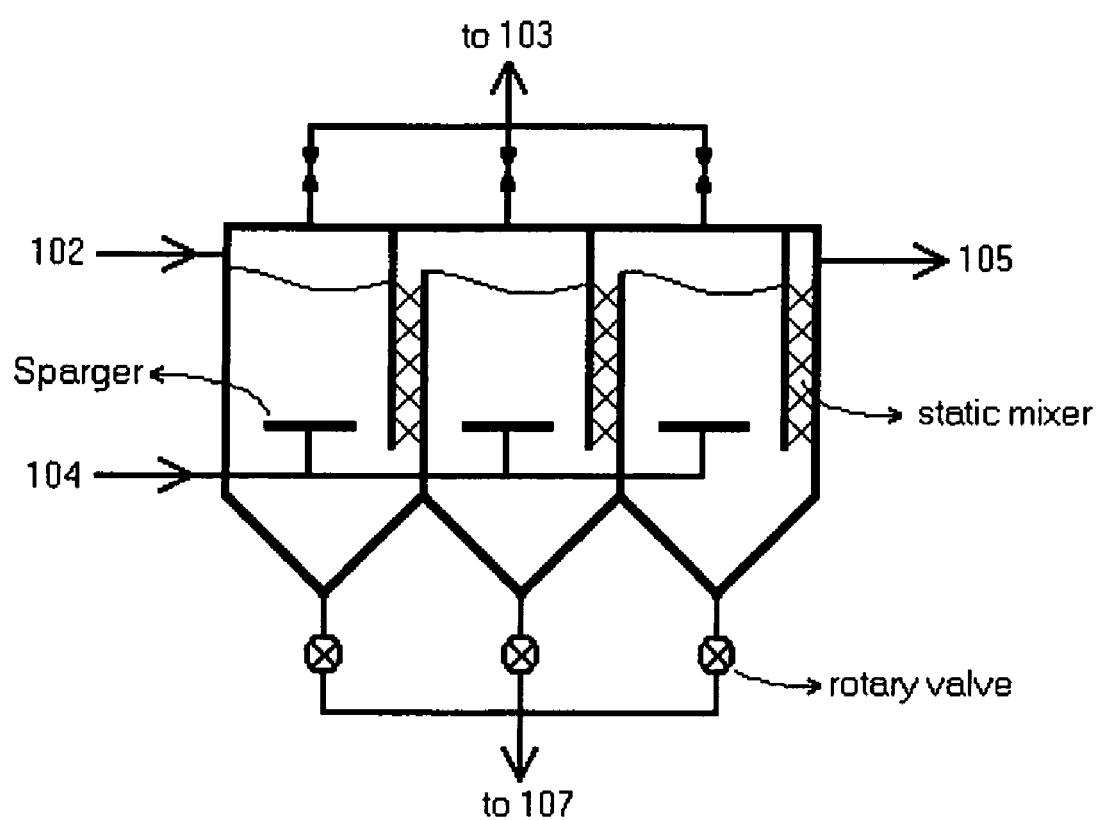
FIG. 3 is a sketch figure of a preferred embodiment of the contactor.

The schematic figure of a preferred embodiment of the contactor is shown in FIG. 3. This contactor represents the special conditions to contact the outlet slurry of the reactor and the supercritical solvent. The contactor consists three contacting sections. Each contacting section plays the role of a settler. Based on the reactor capacity, the dimensions of contactor are determined in the way that provides a laminar flow in each contacting section. A sparger in each contacting step disperses the supercritical solvent in the slurry and a number of static mixers that is located in the outlet of each section complete the mixing of the supercritical solvent and the slurry.

According to FIG. 3; the output slurry of the reactor is introduced to the first section of the contactor through line 102. The cyclic solvent is introduced to the contactor through line 104 (or 304). The supercritical solvent is divided to three portions and is dispersed in each section. The laminar flow regime allows to settling a portion of catalysts in each section. The accumulated catalysts are withdrawn through a rotary valve that located in the bottom of each section and after joining together is sent to stream 107 (concentrated catalyst phase). The light gases that are accumulated in the top of each section are also joined together and then sent to stream 103. The mixture of slurry and supercritical solvent that have missed a portion of the catalyst and light gases leaves the contactor through line 105 and is sent to the catalyst separation section.

Figure 4:
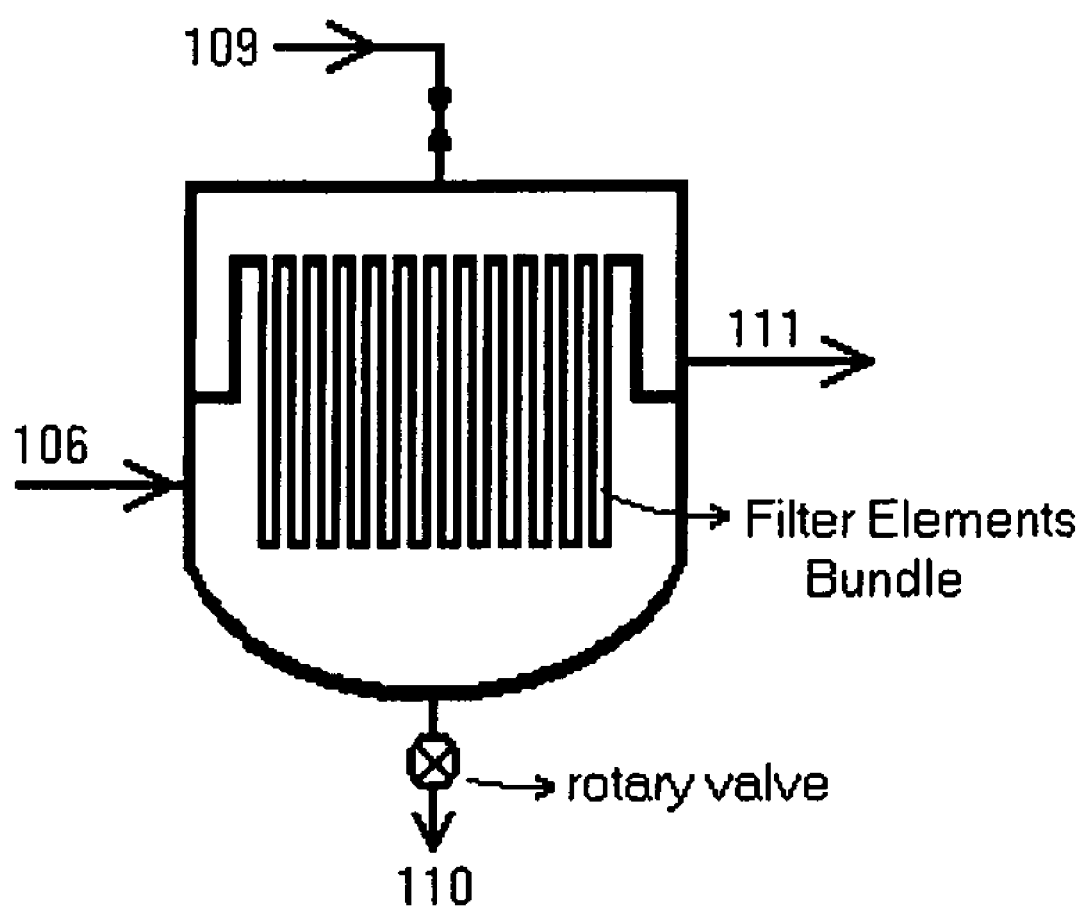
FIG. 4 is a sketch figure of a preferred embodiment of the filtration system.

The sketch figure of one filtration tank (F-101 at FIG. 1) has been shown in FIG. 4. The filtration tank has a cylindrical-conic shape with a filter elements bundle. As shown in FIG. 4, the output stream of the liquid cyclone containing 5-20% (weight) catalyst (stream 106), is introduced to filter house as the feed. The purified wax with the catalyst content of lower than 5 ppm, comes out through stream 111. To back flush the filter elements, a little portion of cyclic solvent is intermittently fed from top section of filtration tank as the washing solvent (stream 109). The concentrated catalyst phase that has been accumulated in the bottom of filtration tank is withdrawn accompanying washing solvent.

The invention claimed is:

1. A method for the separation of catalyst particles and the wax product from the output slurry of a Fischer-Tropsch bubble column reactor, said method comprises: i) Contacting a hydrocarbon solvent from a cyclic solvent stream with the slurry, wherein the solvent is a hydrocarbon fraction which is pressurized and heated to its supercritical state and the temperature and the pressure of the solvent at the supercritical state are similar to those of the F-T reactor; ii) Separating the catalyst from the hydrocarbon mixture of the solvent and the slurry in a catalyst separation section which comprises a forced sedimentation step as a primary separation stage and a following filtration step as a secondary separation stage, to form a concentrated catalyst stream containing the catalyst particles and to form an enriched solvent stream containing the reactor wax product and hydrocarbon solvent; iii) Separating the hydrocarbon solvent and the wax product from the enriched solvent stream in a solvent recovery section to form a recovered solvent phase and a purified wax phase; iv) Directing the recovered solvent phase to the cyclic solvent stream; which is used after re-pressurizing and re-heating in a supercritical solvent supply module to recycling the hydrocarbon solvent for the contacting step; v) Processing of the purified wax phase in an up-grading unit to produce GTL products; and vi) Providing of a make-up solvent for the cyclic solvent stream from a fresh solvent supply section additionally to the recovered solvent to compensate solvent loss in the process.

2. The method according to claim 1, wherein the fresh solvent supply section is located in the up-grading unit.

3. The method according to claim 1, wherein the make-up solvent is provided by the fractionation of a portion of the output stream of the naphtha hydrotreater reactor and/or the product naphtha stream in the upgrading unit.

4. The method according to claim 1, wherein the concentrated catalyst stream is recycled in a catalyst-recycling module comprising a buffer tank and the recycled concentrated catalyst stream is purged to the SBC reactor by an inert gas.

5. The method according to claim 1, wherein in the solvent recovery section one fractionation step is used to separate the light compounds from the recovered solvent in the primary flashing step, and the other fractionation step is used to separate the trace wax from the recovered solvent in the secondary flashing step.

6. The method according to claim 1, wherein the solvent/wax ratio of the contacting step that is from 4:1 to 6:1.

7. The method according to claim 1, wherein the catalyst separation section can be a combined system of a liquid cyclone as the primary separation stage and a T-type filter with several sintered metal filter elements, as the secondary separation stage.

8. The method according to claim 1, wherein the filter elements pore sizes of the filter elements using in the filtration step are between 3 to 5 microns.

9. The method according to claim 1, wherein the hydrocarbon fraction has a normal boiling range of 65 to 75° C.

10. The method according to claim 1, wherein the pressure in the separation process is 30 to 40 bar and the temperature is 200-300° C.

11. The method according to claim 9, wherein the hydrocarbon fraction has a normal boiling range of 66 to 69° C.

12. The method according to claim 10, wherein the pressure in the separation process is 35-40 bar and the temperature is 250-300° C.

13. The method according to claim 1, wherein in the solvent recovery section at least one separation step and at least one fractionation step is used to separate the light compounds from the recovered solvent in the primary flashing step, and at least one separation step and at least one fractionation step is used to separate the trace wax from the recovered solvent in the secondary flashing step.

* * * * *